US010997137B1

(12) United States Patent
Goyal et al.

(10) Patent No.: US 10,997,137 B1
(45) Date of Patent: May 4, 2021

(54) TWO-DIMENSIONAL PARTITION SPLITTING IN A TIME-SERIES DATABASE

(71) Applicant: Amazon Technologies, Inc., Seattle, WA (US)

(72) Inventors: Dumanshu Goyal, Seattle, WA (US); Timothy A. Rath, Olympia, WA (US)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 16/219,686

(22) Filed: Dec. 13, 2018

(51) Int. Cl.
*G06F 16/00* (2019.01)
*G06F 16/21* (2019.01)
(Continued)

(52) U.S. Cl.
CPC .......... *G06F 16/219* (2019.01); *G06F 16/248* (2019.01); *G06F 16/2477* (2019.01); *G06F 16/24573* (2019.01)

(58) Field of Classification Search
CPC ........ G06F 30/367; G06F 16/21; G06F 16/27; G06F 19/3418; G06F 30/33; G06F 16/275; G06F 16/278; G06F 11/2069; G06F 11/2076; G06F 11/1469; G06F 11/2028; G06F 11/2048; G06F 11/2064; G06F 16/178; G06F 11/1446; G06F 11/1458; G06F 11/2094; G06F 11/3055; G06F 16/1748; G06F 16/2428; G06F 16/2471; G06F 16/2477; G06F 16/248; G06F 16/273; G06F 16/951; G06F 2201/81; G06F 30/20; G06F 9/5033; G06Q 10/101; G06Q 10/103; G06Q 40/00; G08C 25/02; H04L 41/0609; H04L 41/0618; H04L 41/12; H04L 43/10;
(Continued)

(56) References Cited

U.S. PATENT DOCUMENTS 8,132,046 B2 3/2012 Varghese
8,161,448 B1 * 4/2012 Croix .................... G06F 30/367
716/136
(Continued)

OTHER PUBLICATIONS

U.S. Appl. No. 16/116,791, filed Aug. 29, 2018, Mustafa Ozan Ozen, et al.
(Continued)

*Primary Examiner* — Shyue Jiunn Hwa
(74) *Attorney, Agent, or Firm* — Robert C. Kowert; Kowert, Hood, Munyon, Rankin & Goetzel, P.C.

(57) ABSTRACT

Methods, systems, and computer-readable media for two-dimensional partition splitting in a time-series database are disclosed. Stream processor(s) write elements of time-series data to a first replica group of a first tile associated with a first set of spatial and temporal boundaries. A second replica group is initialized with the same boundaries. A control plane generates updated metadata for the first tile. The updated metadata indicates a modified first set of spatial and temporal boundaries for the first replica group associated with the first tile and a second set of spatial and temporal boundaries for the second replica group associated with a second tile. The modified first set represents a first portion of the first set, and the second set represents a second portion of the first set. The updated metadata is obtained by the stream processor(s) which write, to the second tile, time-series data within the second set of boundaries.

20 Claims, 9 Drawing Sheets

(51) Int. Cl.
*G06F 16/2457* (2019.01)
*G06F 16/2458* (2019.01)
*G06F 16/248* (2019.01)

(58) Field of Classification Search
CPC ........ H04N 19/46; H04N 19/61; H04N 19/82;
H04N 19/895; H04N 21/6377; H04N
21/658; H04N 5/335; H04N 5/347; H04N
5/357; H04N 5/378; H04N 7/122; H04N
7/125; H04N 7/17309
See application file for complete search history.

(56) References Cited

U.S. PATENT DOCUMENTS

| | | | |
|---|---|---|---|
| 8,276,154 B2 | 9/2012 | Toub et al. | |
| 8,335,765 B2 | 12/2012 | Sivasubramanian et al. | |
| 8,386,540 B1 | 2/2013 | McAlister et al. | |
| 8,595,547 B1 | 11/2013 | Sivasubramanian et al. | |
| 8,601,112 B1 | 12/2013 | Nordstrom et al. | |
| 9,286,001 B2 | 3/2016 | Skjolsvold et al. | |
| 9,449,122 B2 | 9/2016 | Haas et al. | |
| 9,607,019 B1 | 3/2017 | Swift et al. | |
| 9,607,067 B2 | 3/2017 | Haas et al. | |
| 9,626,374 B2 | 4/2017 | Hirsch et al. | |
| 9,672,257 B2 | 6/2017 | Tobin et al. | |
| 9,773,015 B2 | 9/2017 | Guo et al. | |
| 9,817,727 B2 | 11/2017 | McAlister et al. | |
| 9,836,492 B1 | 12/2017 | Hermanson | |
| 9,934,107 B1 | 4/2018 | Chikkanayakanahally et al. | |
| 10,007,513 B2 | 6/2018 | Malladi et al. | |
| 10,400,583 B1* | 9/2019 | Ricker | G06F 17/10 |
| 2011/0083046 A1* | 4/2011 | Andrade | G06F 11/0793 |
| | | | 714/47.1 |
| 2012/0179791 A1* | 7/2012 | Little | G06F 9/52 |
| | | | 709/221 |
| 2013/0110781 A1* | 5/2013 | Golab | G06F 16/275 |
| | | | 707/638 |
| 2014/0297585 A1* | 10/2014 | Chawda | G06F 16/278 |
| | | | 707/610 |
| 2018/0188045 A1* | 7/2018 | Wheeler | B60W 30/0956 |

OTHER PUBLICATIONS

U.S. Appl. No. 16/176,629, filed Oct. 31, 2018, Dumanshu Goyal.
U.S. Appl. No. 16/216,580, filed Dec. 11, 2018, Dumanshu Goyal et al.
U.S. Appl. No. 16/199,078, filed Nov. 23, 2018, Timothy A. Rath et al.
U.S. Appl. No. 16/199,102, filed Nov. 23, 2018, Lonnie J. Princehouse et al.
U.S. Appl. No. 16/199,103, filed Nov. 23, 2018, Timothy A. Rath et al.

\* cited by examiner

TWO-DIMENSIONAL PARTITION SPLITTING IN A TIME-SERIES DATABASE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
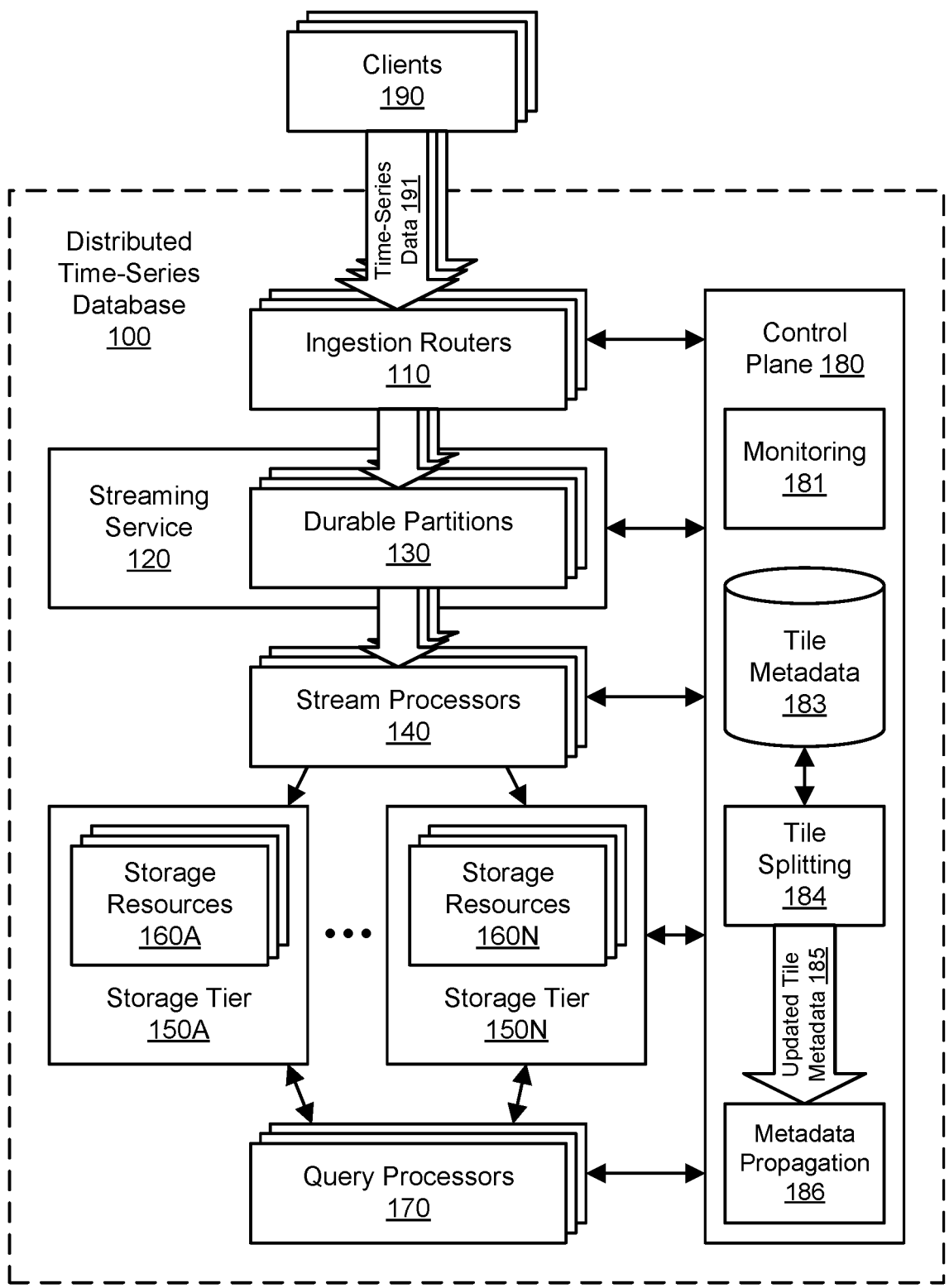
FIG. 1 illustrates an example system environment for two-dimensional partition splitting in a time-series database, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for two-dimensional partition splitting in a time-series database are described. A time-series database may include a set of stream processors, also referred to as writers, that process one or more streams of time-series data in a distributed manner. The time-series data may be partitioned into a set of tiles along non-overlapping temporal and spatial boundaries. The database may also include a set of storage nodes that are distributed across various data centers, availability zones, or other logical or geographical locations. The storage nodes may offer low-latency access to a "hot tier" of data, such as the most recent data elements from the stream(s). For a particular tile having particular temporal and spatial boundaries, a stream processor may write time-series data to a group of replicas on particular storage nodes. At some point after the tile's starting time and before the tile's ending time, the database may determine that the storage capacity of the tile (e.g., the capacity of the replicas) is insufficient for the anticipated amount of time-series data belonging to the tile's boundaries. The database may initiate a split of the tile to increase the total storage capacity for time-series data within the tile's original temporal and spatial boundaries. The split may produce a new tile that represents a portion of the original boundaries, with the original tile representing the remainder of the original boundaries. For example, the time range of the tile may be divided (e.g., into two equal portions), and the new tile may be assigned the latter portion of the range. As another example, the spatial range may be divided (e.g., into two equal portions), and the new tile may be assigned part of the original spatial range. To perform the split, a control plane may modify metadata for the original tile to include a pointer to the new tile (and its replica group), the temporal and spatial boundaries of the new tile, and the modified temporal and spatial boundaries of the original tile. The updated metadata may be propagated to the storage nodes and query processors. Using these techniques, a tile may be split while maintaining high availability and also preventing duplicate data points from being stored in both the original and new tiles. By preventing duplicate data points in the split, queries of the database may be performed more efficiently.

As one skilled in the art will appreciate in light of this disclosure, embodiments may be capable of achieving certain technical advantages, including some or all of the following: (1) improving the scalability of a distributed database by permitting the addition of new tiles within existing sets of temporal and spatial boundaries; (2) improving the availability of a distributed database by permitting the addition of new tiles without taking the database offline; (3) reducing storage requirements of a distributed database by performing deduplication of data points across one or more storage partitions; (4) improving the performance of queries by allowing query predicate pushdown to individual storage nodes that are prevented from storing duplicate data points; (5) improving the availability of a multi-tenant database by performing heat management through tile splitting for tiles affecting other tenants; and so on.

FIG. 1 illustrates an example system environment for two-dimensional partition splitting in a time-series database, according to one embodiment. A distributed time-series database 100 may ingest and store time-series data 191 and make the stored data available for queries. Elements of the time-series data 191 may be received by the database 100 from clients 190 over time, e.g., as one or more streams of time-series data. Clients 190 may represent various types of client devices that generate or otherwise provide data in various time series to the database 100. A time series may include a set of values that change over time, such as sensor measurements or system metrics, and that are timestamped or otherwise positioned along a temporal axis. For example, a set of client devices 190 may repeatedly gather information such as vibration, temperature, and pressure using sensors. As another example, a set of client devices 190 may detect state transitions, e.g., in a computer network. Client devices 190 that provide the time-series data 191 to the database 100 may be associated with various domains such as Internet of Things (IoT) and "smart home" networks, autonomous vehicles, manufacturing facilities, distribution facilities, computational resources in a multi-tenant provider network, facilities management systems, stock trading systems, and so on. Some time series or hierarchies of time series may include very large numbers of measurements. For example, a multi-tenant provider network may monitor trillions of events per day. As another example, a fulfillment center for an online store may have thousands of sensors that monitor the state of equipment, goods, and software. In order to efficiently ingest, transform, store, and/or query such large quantities of data, the distributed database 100 may employ scaling techniques while keeping the database online for continued ingestion and querying. The scaling may include performing tile splits as described in greater detail below.

The ingested time-series data 191 may represent a large number of individual time series. An individual time series may include a sequence of values or observations (e.g., for a feature of a system or a phenomenon) that can be plotted over time. An individual time series may be uniquely identified by a set of dimensions such as what the observations are measuring, where the observations were measured, client-specified tags such as device model or instance type, and so on. For example, a smart-home device may produce a time series representing measurements of humidity in a particular room at a particular address. The same device may also produce other time series representing measurements at the same location for temperature, dust levels, carbon dioxide, and so on. As another example, a virtual compute instance in a multi-tenant provider network may emit a time series representing CPU utilization over time, another time series representing disk reads over time, yet another time series representing network packets received over time, and so on. Because developers often operate on related time series together, time series that are related (e.g., by physical proximity, by being generated by the same device, and so on) may be clustered using the database 100 for efficient storage and retrieval. To enable such applications, the database 100 may offer a query language that provides filtering according to dimensions such as the device model, instance type, region, address, location, and so on. In one embodiment, any change to such a dimension may produce a new time series in the database 100.

The database 100 may manage a large amount of time-series data throughout the lifecycle of the data. The times-series data 191 may be received at the database 100 using a fleet of ingestion routers 110. The time-series data may typically arrive at the database 100 in time order, but the database may be able to ingest out-of-order data as well. The ingestion routers 110 may divide the data 191 from the clients 190 into non-overlapping partitions 130. In one embodiment, the ingested data may be spatially partitioned along non-overlapping spatial boundaries according to the time series or range of the data, one or more tags associated with the data, the region that produced the data, the category to which the data belongs, and/or other suitable metadata. As will be discussed in greater detail below, ingested time-series data may be mapped to different partitions based on hierarchical clustering in order to achieve better performance of data storage and retrieval. A partition may include one time series or multiple time series. The partitions 130 may be maintained using persistent storage resources and may be termed durable partitions. In various embodiments, the durable partitions 130 may be provided by a streaming service 120 or by a durable data store. The streaming service 120 may use shards or other divisions to implement the non-overlapping partitions 130. The streaming service 120 or control plane 180 may dynamically increase or decrease the number of partitions based (at least in part) on the amount or rate of ingestion of time-series data. Similarly, the control plane 180 may dynamically increase or decrease the number of ingestion routers 110 based (at least in part) on the amount or rate of ingestion of time-series data. The use of the durable partitions 130 as a staging area may permit the database 100 to decouple ingestion from stream processing and storage. Acknowledgements of requests to add time-series data elements may be sent to the clients 190 upon the successful addition of time-series data elements to the partitions 130.

A fleet of stream processors 140 may take the time-series data from the durable partitions 140, potentially process the data in various ways, and add the data to one or more storage tiers 150A-150N. For example, one stream processor may write data from one partition to a "hot" storage tier, and another stream processor may write data from the same partition to a "cold" storage tier. As another example, a stream processor may create materialized views or derived tables based on a partition, such as an aggregation or rollup of a time interval. In various embodiments, stream processors may perform reordering, deduplication, aggregation of different time periods, and other transformations on time series data. The data 191 may be routed from the durable partitions 130 to the stream processors 140 according to routing metadata, e.g., that maps different time series or ranges of the data to different stream processors. In one embodiment, a given stream processor may be assigned to one and only one partition at a time. In one embodiment, as the number of partitions increases or decreases based on the amount or rate of ingestion, the number of stream processors may also tend to increase or decrease dynamically.

In one embodiment, the stream processors 140 may organize the time series in tables. The stream processors 140 may also be referred to as writers or table builders. A table may store one or more time series. A table may be a named entity that stores related time series that are usable by the same application. A data point in a time series may be stored in a record. Data points may be added to the database 100 using application programming interface (API) calls or other programmatic interfaces. In one embodiment, data points for multiple time series (e.g., for related time series generated by the same client device) with the same timestamp may be added by a client using a single API call. A data point may be associated with a timestamp, one or more dimensions (in name-value pairs) representing characteristics of the time series, and a measure representing a variable whose value is tracked over time. Timestamps may be provided by clients or automatically added upon ingestion. Measures may be identified by names and may often have numeric values. Measures may be used by the database 100 in generating aggregations such as min, max, average, and count. For example, a time series related to automobiles may be identified by a unique combination of values for dimensions of a vehicle identification number (VIN), country, state, and city, while measures for such a time series may include the battery state and the miles traveled per day. In one embodiment, dimensions may be indexed for use in queries, and queries may specify time intervals and/or dimensions rather than individual measures.

The various storage tiers 150A-150N may represent different use cases for time-series data. The storage tiers 150A-150N may differ in their performance characteristics, durability characteristics, and cost characteristics. For example, the database 100 may include a hot tier (such as tier 150A) that offers the lowest latency by storing recent time-series data in volatile memory resources (e.g., random access memory) across a distributed set of storages nodes. As another example, the database 100 may include a cold tier that offers higher latency (but a lower cost) by storing a longer interval of time-series data using persistent storage resources such as disk drives. The database 100 may include other tiers such as a warm tier that stores recent time-series data in nonvolatile storage resources (e.g., solid-state drives) across a distributed set of storages nodes, a frozen tier that stores even older time-series data in sequential access storage media, and so on. Based on their needs and budgets, users of the time-series database 100 may select and configure one or more of the storage tiers 150A-150N for storage of their time-series data.

In one embodiment, the database 100 may represent a container of tables and policies, such as retention policies. Policies may be applied at the database level for all tables or may be overridden for individual tables. The database 100 may offer a control plane 180 that permits users (e.g., developers of applications) and other systems to perform management and modeling of time series data. For example, the control plane 180 may offer APIs for creating, deleting, and listing tables (or entire databases); describing tables and policies; creating and updating policies and associating policies with tables; listing series within a table; and so on. A retention policy may determine the time interval for which an element of time-series data is kept in a particular tier; beyond that time interval, the time-series data may expire and may be deleted from the tier. Different tiers may differ in their retention policies for time-series data. Tables may also differ in their retention policies. In one embodiment, the database 100 may have default retention periods of three hours for the hot tier and one year for the cold tier. In one embodiment, costs may be assessed to clients for the use of the database 100 to store their time-series data, and the per-measure costs assessed for the hot tier may be greater than the per-measure costs for the cold tier. Accordingly, clients may adjust the retention policies to reach a balance between performance (e.g., query latency) and cost.

The time-series data may be deemed immutable once written to a particular storage tier, e.g., such that new values may be appended to a time series but existing values may not be deleted (except for expiration based on a retention policy). Using a fleet of query processors 170, queries of time-series data may be performed for particular time intervals. The database 100 may enable specialized mathematical functions such as interpolation, approximation, and smoothing to be performed on time-series data, e.g., in order to find trends and patterns. By contrast, traditional relational database management systems may require developers to write complex application code in order to perform such functions. By interacting with the query processors 170, various applications may use the database 100 to perform analysis of time-series data. For example, machine learning and machine vision applications may use time-series data managed by the database 100.

In one embodiment, one or more components of the distributed database 100, such as compute instances and/or storage resources, may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide resources such as the ingestion routers 110, durable partitions 130, stream processors 140, storage resources 160A-160N, and/or query processors 170. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the distributed database 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. In one embodiment, portions of the functionality of the provider network, such as the distributed database 100, may be offered to clients in exchange for fees.

In one or more of the storage tiers such as tier 150A, the time-series data may be partitioned into a set of tiles along non-overlapping temporal and spatial boundaries. A tile may thus represent a partition of time-series data within a time range (between a starting time and an ending time) and within a range of keys. The storage resources 160A for such a tier 150A may also include a set of storage nodes that are distributed across various data centers, availability zones, or other logical or geographical locations. A tile may be replicated across the storage nodes with a group of replicas (e.g., three replicas) that are eventually consistent without using a consensus mechanism. The control plane 180 may include a component for tile splitting 184. Splitting a tile may include increasing the amount of storage resources associated with the tile (e.g., its replicas) by allocating additional storage resources to represent a portion of the tile's boundaries. The storage resources may represent volatile memory resources (e.g., RAM) and/or nonvolatile memory resources (e.g., solid-state drives). In one embodiments, tile splitting 184 may be managed by the control plane 180. The control plane 180 may include a monitoring component 181 that obtains data relating to the usage and/or performance of the storage tier 150A. For example, the monitoring 181 may determine that the amount of storage resources 160A for a particular set of spatial and temporal boundaries will be insufficient to meet the storage requirements of the time-series data 191 in the near future. In one embodiment, the tile splitting 184 may be initiated automatically, e.g., based (at least in part) on the monitoring 181. The tile splitting 184 may be performed based on the observed state of the database 100 or based on the anticipated state of the database.

A particular tile may be associated with tile metadata maintained in a tile metadata repository 183 by the control plane 180. The tile metadata may include addresses or other identifying characteristics of the particular replicas in the tile's replica group, e.g., of the storage nodes that host the replicas. The tile metadata may also be associated with a version number. As will be discussed in greater detail below, the version numbers of tile metadata may be incremented to transition the replica group from one state to another state, and the version numbers may be used at various components of the database 100 to ensure that writes by stream processors and queries by query processors are being performed using up-to-date tile metadata. In one embodiment, state transitions that impact the tile metadata may be associated with tile splits. In one embodiment, state transitions that impact the tile metadata may include any changes to the spatial or temporal boundaries of the tile, including boundary changes resulting from tile splits. In some embodiments, state transitions that impact the tile metadata may include any membership change to the replica group and/or status change to replicas in the group.

The control plane 180 may maintain the current version of tile metadata for one or more tiles, e.g., using a durable store 183 for the metadata. The durable store 183 may support atomic updates to the metadata for a tile. In one embodiment, the tile splitting component 184 may create and/or generate updated tile metadata 185. In one embodiment, the control plane 180 may include a component 186 for propagation of tile metadata (such as updated tile metadata 185) to various components of the database 100, including stream processors 170A-170M, storage nodes 180A-180N, and query processors (not shown). As shown in FIG. 1, the metadata propagation 186 may provide a particular version of tile metadata for a tile to the storage nodes that store the tile's replicas as well as to any stream processors that handle the replica group. New elements of data may be routed by the stream processors according to the tile metadata.

In one embodiment, the tile metadata may include a range key (e.g., a hash value) for the tile, a start time for the tile, an end time for the tile, spatial bounds for the tile, and/or other identifying characteristics. In one embodiment, the tile metadata may include a status (e.g., "active") of the replica group. In one embodiment, the tile metadata may include a list of replicas, where each replica has a replica identifier, a list of one or more containers, and a status (e.g., "active"). A container may be associated in the tile metadata with a container identifier and a storage node identifier. The tile metadata may also include a version number or other version identifier. In one embodiment, the version number may increase monotonically as changes to the membership or boundaries of the tile are implemented, e.g., as a result of tile splitting 184.

Figure 9:
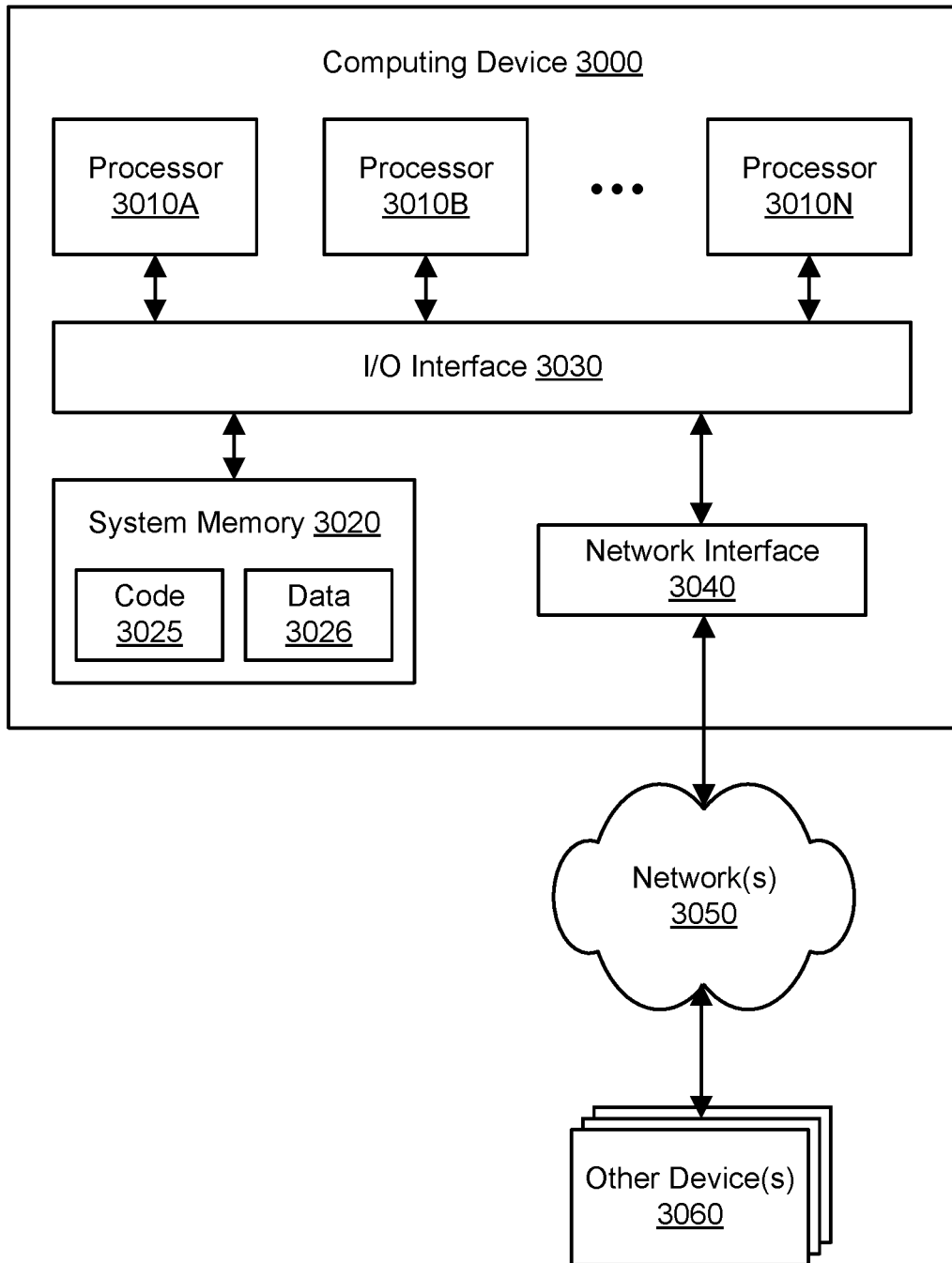
FIG. 9 illustrates an example computing device that may be used in some embodiments.

In various embodiments, components of the distributed database 100, such as the ingestion routers 110, streaming service 120, stream processors 140, storage tiers 150A-150N, query processors 170, and/or control plane 180 may be implemented using any suitable number and configuration of computing devices, any of which may be implemented by the example computing device 3000 illustrated in FIG. 9. In some embodiments, the computing devices may be located in any suitable number of data centers or geographical locations. In various embodiments, at least some of the functionality of the distributed database 100 may be provided by the same computing device or by different computing devices. In various embodiments, if any of the components of the distributed database 100 are implemented using different computing devices, then the components and their respective computing devices may be communicatively coupled, e.g., via one or more networks. Any of the components of the distributed database 100 may represent any combination of software and hardware usable to perform their respective functions. In some embodiments, operations implemented by the distributed database 100 may be performed automatically, e.g., without a need for user initiation or user intervention after an initial configuration stage, and/or programmatically, e.g., by execution of program instructions on at least one computing device. In some embodiments, the distributed database 100 may include additional components not shown, fewer components than shown, or different combinations, configurations, or quantities of the components shown.

Clients 190 of the distributed database 100 may represent external devices, systems, or entities with respect to the database. In one embodiment, the client devices may be implemented using any suitable number and configuration of computing devices, any of which may be implemented by the example computing device 3000 illustrated in FIG. 9. Clients 190 may convey network-based service requests to the ingestion router fleet 110 via one or more networks, e.g., to supply a stream of data for processing using the stream processors 140 and storage in the storage tiers 150A-150N. The network(s) may encompass any suitable combination of networking hardware and protocols necessary to establish network-based communications between client devices 190 and the distributed database 100. For example, the network (s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the distributed database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the distributed database 100. In one embodiment, client devices may communicate with the distributed database 100 using a private network rather than the public Internet. In various embodiments, the various components of the distributed database 100 may also communicate with other components of the distributed database using one or more network interconnects.

Figure 2:
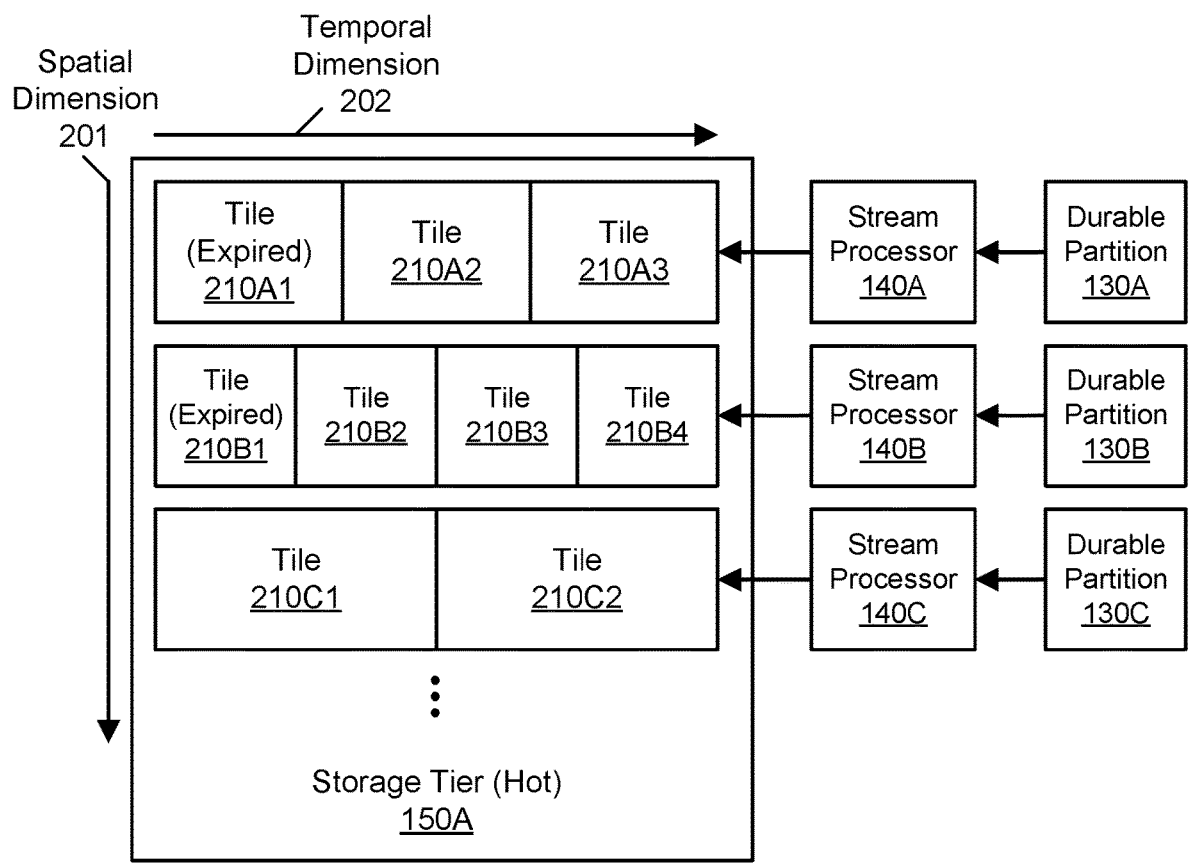
FIG. 2 illustrates further aspects of the example system environment for two-dimensional partition splitting in a time-series database, including an example of two-dimensional tiles in a storage tier, according to one embodiment.

FIG. 2 illustrates further aspects of the example system environment for two-dimensional partition splitting in a time-series database, including an example of two-dimensional tiles in a storage tier, according to one embodiment. As discussed above, the database 100 may include a hot storage tier such as tier 150A that stores recent data with high availability and low latency. In one embodiment, the hot tier 150A may include a set of storage hosts or storage nodes that include computational resources and memory resources. The storage nodes may store time-series data using tiles that are generated or appended to by stream processors. Tiles may be stored using storage resources such as memory (e.g., RAM) and/or solid-state drives for lower latency of storage and retrieval. Tiles may be replicated across different nodes (e.g., in different data centers or availability zones) for improved durability. Tiles may be partitioned along non-overlapping spatial boundaries, e.g., such that time-series data from one time series is assigned to one tile while time-series data from another time series is assigned to another tile. However, a tile may hold one or more time series. The spatial range may be based on hierarchical clustering that seeks to co-locate related measurements and/or time series in the same partition, and the hierarchical clustering may be performed by the ingestion routers 110. Tiles may also be partitioned along non-overlapping temporal boundaries. Due to the spatial dimension 201 and the temporal dimension 202, tiles may be said to be two-dimensional. The two-dimensional partitioning represented in tiles may be decoupled from the partitioning of the ingestion stage due to the difference in write latency between the stages. The same partitioning scheme may be used, but the partition ranges may differ.

In the example of FIG. 2, a set of time series may be mapped to durable partitions 130A, 130B, and 130C based on a spatial range (e.g., hierarchical clustering). Particular partitions may be mapped to particular stream processors for writing data from the partitions to the hot tier 150A. For example, partition 130A may be assigned to stream processor 140A that writes to the hot tier, partition 130B may be assigned to stream processor 140B that writes to the hot tier, and partition 130C may be assigned to stream processor 140C that writes to the hot tier. For a given time series or partition, tiles representing older windows of time may be termed "closed," while a tile representing a current window of time may be termed "open." Tiles may be closed when the amount of data reached a threshold or when a maximum time interval is reached. For current data points (e.g., data not received out of order), the stream processor for a partition may write to an open tile. Out-of-order data may be routed to previously closed tiles in some circumstances. Tiles whose temporal boundaries are beyond the retention period (e.g., three hours) for the tier and table may be deemed expired and either deleted or marked for deletion. As shown in the example of FIG. 2, stream processor 140A may write to an open tile 210A3 that was preceded in time by a now-closed tile 210A2 that was preceded in time by a now-expired tile 210A. Similarly, stream processor 140B may write to an open tile 210B4 that was preceded in time by a now-closed tile 210B3 that was preceded in time by a now-closed tile 210B2 that was preceded in time by a now-expired tile 210B1. Additionally, stream processor 140C may write to an open tile 210C2 that was preceded in time by a now-closed tile 210C1. As discussed above, the contents of a tile may be replicated (e.g., using three replicas) across different location or zones to achieve greater durability of the hot tier.

Figure 3:
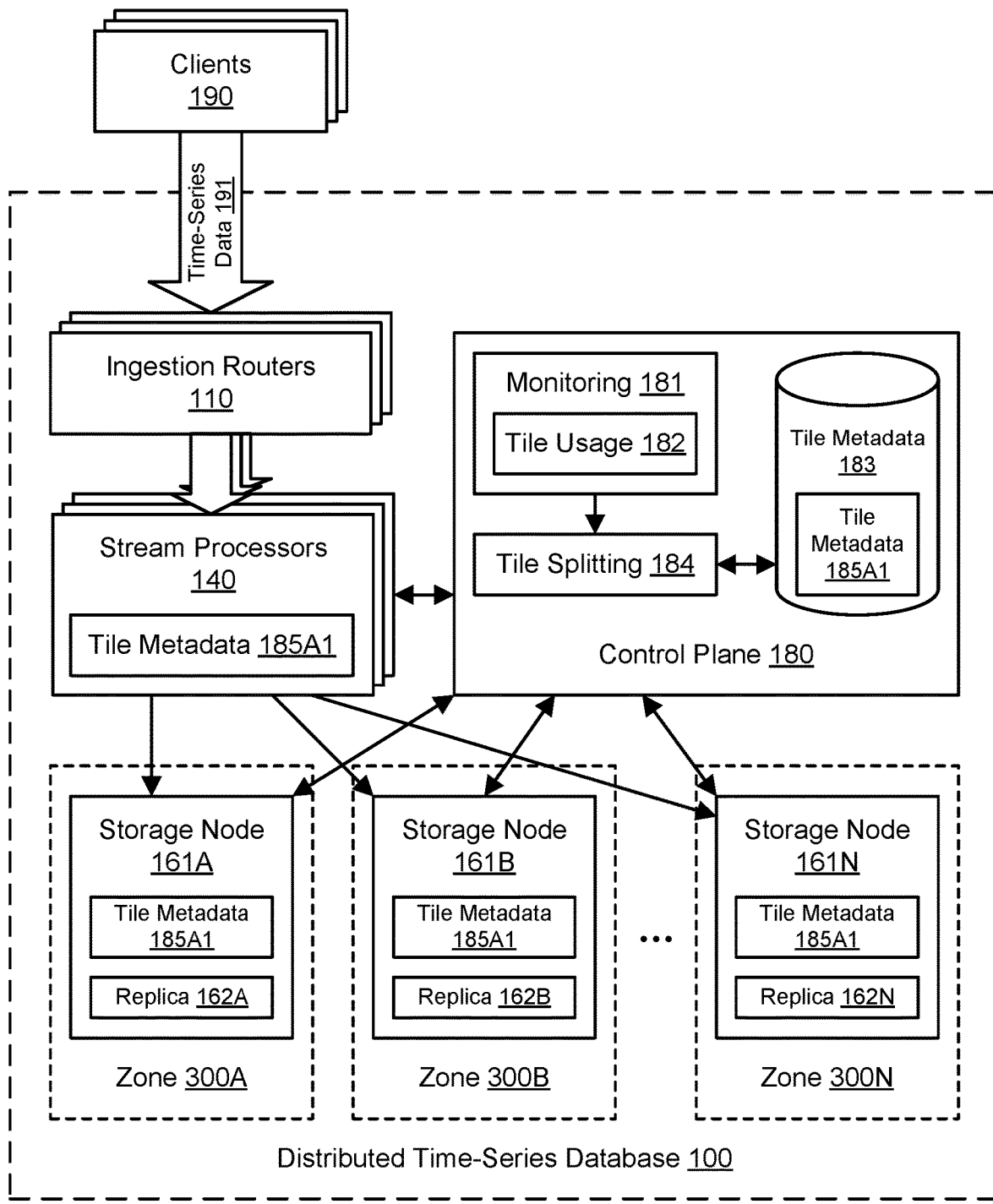
FIG. 3 illustrates further aspects of the example system environment for two-dimensional partition splitting in a time-series database, including an initial state of a replica group prior to a tile split for the corresponding tile, according to one embodiment.

FIG. 3 illustrates further aspects of the example system environment for two-dimensional partition splitting in a time-series database, including an initial state of a replica group prior to a tile split for the corresponding tile, according to one embodiment. In the storage tier 150A, a particular tile (such as tile 210A3) may be replicated across a set of replicas in a replica group. In one embodiment, a tile may have three replicas. The number of replicas may be determined based at least in part on user input and/or usage metrics, e.g., such that the number of replicas may be increased to lower a query latency for a particular tile or time series. As discussed above, tiles in the hot tier 150A may be stored by storage nodes using volatile memory resources for low-latency storage and retrieval of time-series data. To enhance the durability of the hot tier 150A, a replica group may be distributed across a plurality of availability zones, data centers, or geographical locations. As shown in the example of FIG. 3, a replica group including replicas 162A, 162B, and 162N may be stored across one storage node 161A in a first zone 300Z, another storage node 161B in another zone 300B, and yet another storage node 161N in yet another zone 300N. In one embodiment, a given storage node may store replicas for 7 different tiles.

Time-series data 191 may be partitioned spatially by the ingestion routers 110 and then processed by stream processors 140. In one embodiment, particular stream processors may be assigned to particular partitions of time-series data. For a particular tile, the stream processors may route data points of time-series data to individual replicas of the tile using tile metadata 185A1. The tile metadata 185A1 may indicate the three replicas 162A, 162B, and 162N; the status of the replicas (e.g., "ACTIVE" for both writes and reads); the spatial and temporal boundaries of the tile; and a version number of the metadata (e.g., version 6). The spatial boundaries may represent a spatial range of a plurality of keys. Keys may represent a combination of dimensions, tags, and/or other metadata of various time series. The temporal boundaries may represent a time range with a starting time and an ending time. The tile metadata 185A1 may be maintained by the control plane 180 in the tile metadata store 183 and provided by the control plane to other components of the database 100. The stream processor(s) 140 and storage nodes 161A-161N may have local copies of the tile metadata 185A1. Write requests may indicate the version number of the tile metadata at the stream processor, and a write attempt for time-series data may be successful only if both the stream processor and the storage node targeted for the write have the same version of the tile metadata. In one embodiment, tile metadata may first be propagated by the control plane 180 to the storage nodes, and the storage nodes may provide the latest tile metadata to stream processors that send write requests with outdated version numbers.

In one embodiment, the tile metadata 185A1 for a tile T1 may be represented with the following example data structure, with the tile initially restricted to a time range between 1 and 10 and a spatial range between 0x0000 and 0xFFFF, and with the tile having three replicas R1, R2, and R3 that are writable and readable:

```
{
    tileId: "T1",
    startTime: 1,
    endTime: 10,
    partitionStartKey: "0x0000",
    partitionEndKey: "0xFFFF",
    version: 2,
```

```
            status: "ACTIVE",
            replicas: [
                    {
                            containerId: "R1",
                            status: "ACTIVE",
                    },
                    {
                            containerId: "R2",
                            status: "ACTIVE",
                    },
                    {
                            containerId: "R3",
                            status: "ACTIVE",
                    },
            ],
    }
```

At some point, the control plane 180 may decide to initiate tile splitting 184 for the tile having the replicas 162A, 162B, and 162N. In one embodiment, the tile splitting 184 may be initiated by usage or performance monitoring 181, e.g., based (at least in part) on tile usage metrics 182 such as tile "heat," throughput, ingestion rate, and/or remaining capacity. For example, if a tile (e.g., each replica of a tile) is initially allocated 10 GB of memory, but the time-series data is on a pace to exceed that limit before the end of the time range, then tile splitting 184 may be initiated for that tile. As another example, tile splitting 184 may be initiated based (at least in part) on a query rate. In one embodiment, the tile splitting 184 may be initiated during the time range associated with the tile. For example, if the tile's temporal boundaries are 2 PM and 3 PM, then the control plane 180 may initiate a split of the tile at 2:20 PM.

Figure 4:
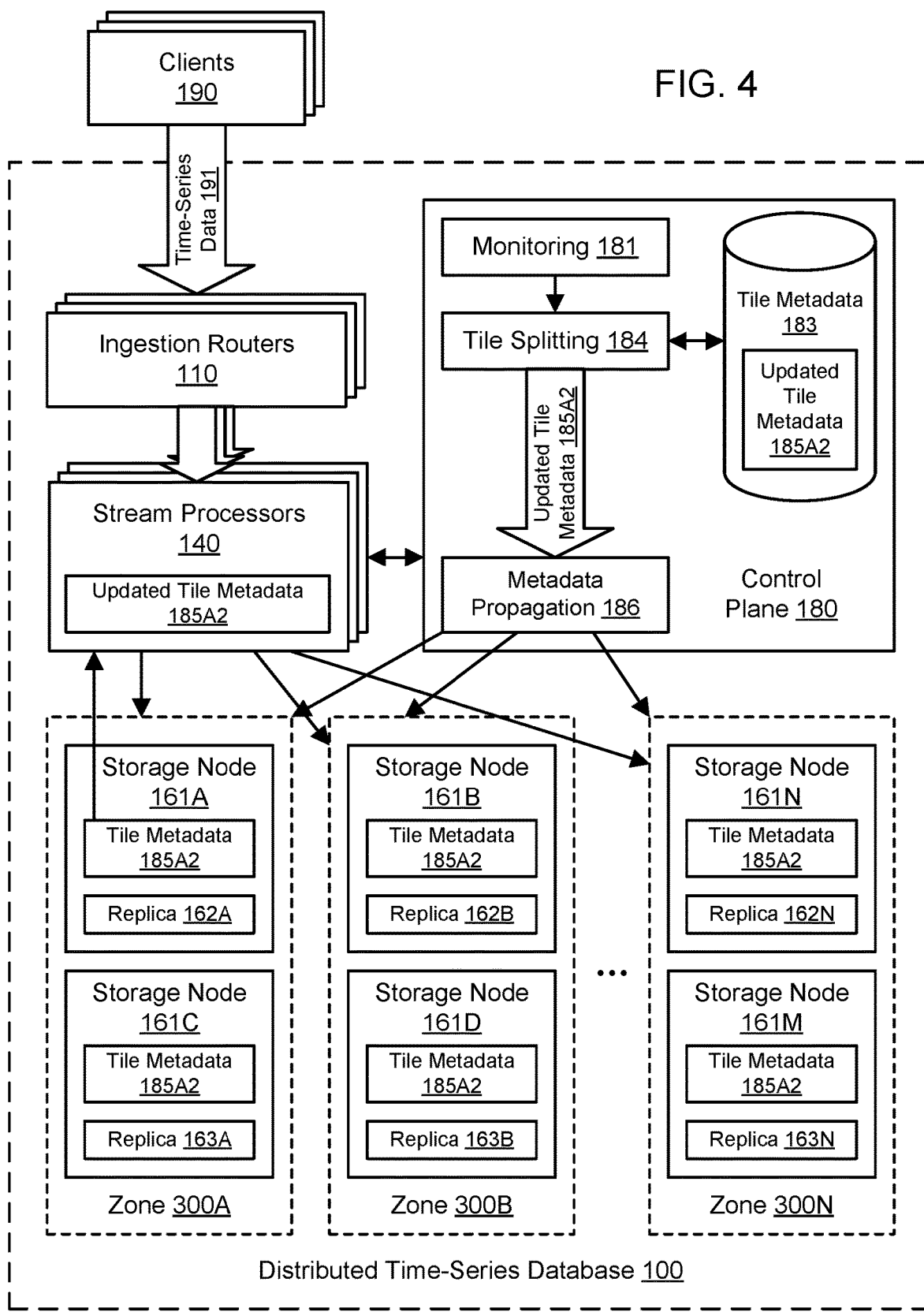
FIG. 4 illustrates further aspects of the example system environment for two-dimensional partition splitting in a time-series database, including an intermediate state of the tile split with replicas of a new tile, according to one embodiment.

FIG. 4 illustrates further aspects of the example system environment for two-dimensional partition splitting in a time-series database, including an intermediate state of the tile split with replicas of a new tile, according to one embodiment. The tile splitting 184 may initialize a new replica group for a new tile. The new replica group may be distributed across different availability zones, data centers, or geographical locations. As shown in the example of FIG. 4, the new replica group may include a replicas 163A on one storage node 161C in the first zone 300Z, a replica 163B on another storage node 161D in the zone 300B, and a replica 163N on yet another storage node 161M in the zone 300N. An initialized replica may include a container for time-series data, e.g., having a particular storage capacity anticipated to meet the storage requirements of a tile. The locations of the replicas may be selected by the control plane 180. In the example of FIG. 4, the new replicas are stored on different storage nodes (but in the same zones 300A-300N) as the original replicas. In one embodiment, one or more replicas in the new replica group may be stored using the same storage node as one or more replicas in the original replica group. In one embodiment, the new replica group may be stored across a different set of zones than the original replica group. For a given tile, the stream processor(s) may initially write incoming data to both the old replica group and the new replica group, where both replica groups share the spatial and temporal boundaries of the original tile.

In performing the tile split 184, the control plane 184 may divide the spatial range and/or temporal range of the original tile. In one embodiment, the control plane 184 may divide the time range into two portions for a two-way tile split. For a two-way tile split, a time range may be divided at some intermediate time between the original starting time and the original ending time. For example, an original time range of 2 PM to 3 PM may be divided into two new ranges of 2 PM to 2:30 PM (for the original tile) and 2:30 PM to 3 PM (for the new tile). The tile split may be initiated before or after the intermediate time. In one embodiment, the tile split may be initiated before the intermediate time to minimize data transfer during the split. In one embodiment, the control plane 184 may divide the spatial range into two portions for a two-way tile split. For a two-way tile split, a spatial range may be divided at an intermediate key boundary such that the original tile is now limited to a first portion (e.g., a first half) of the original key range while the new tile is limited to a second portion (e.g., a second half) of the original key range. In one embodiment, temporal splits may be performed rather than spatial splits in order to minimize data transfer during the split.

To implement the tile split 184, the control plane 184 may generate an updated version 185A2 of the tile metadata 185A1. The updated tile metadata 185A2 may include identifiers and/or locations of the three original replicas 162A, 162B, and 162N; the status of those replicas (e.g., "ACTIVE" for both writes and reads); and the new spatial and temporal boundaries of those replicas (e.g., a first portion of the original time range and the same spatial range, or the same time range and a first portion of the original spatial range). The updated tile metadata 185A2 may also include identifiers and/or locations of the three new replicas 163A, 163B, and 163N; the status of the replicas (e.g., "READ_INELIGIBLE" but writeable); and the spatial and temporal boundaries of those replicas (e.g., a second portion of the original time range and the same spatial range, or the same time range and a second portion of the original spatial range). Additionally, the updated tile metadata 185A2 may include a higher (e.g., incremented) version number of the metadata (e.g., version 5).

In one embodiment, during a first step of the tile split, the updated tile metadata 185A2 for the tile T1 may be represented with the following example data structure, with the version number having been incremented three times to represent three state transitions for the addition of three new replicas R4, R5, and R6 that are writable but not readable:

```
    {
            tileId: "T1",
            startTime: 1,
            endTime: 10,
            partitionStartKey: "0x0000",
            partitionEndKey: "0xFFFF",
            version: 5,
            status: "ACTIVE",
            replicas: [
                    {
                            containerId: "R1",
                            status: "ACTIVE",
                    },
                    {
                            containerId: "R2",
                            status: "ACTIVE",
                    },
                    {
                            containerId: "R3",
                            status: "ACTIVE",
                    },
                    {
                            containerId: "R4",
                            status: "READ_INELIGIBLE",
                    },
                    {
                            containerId: "R5",
                            status: "READ_INELIGIBLE",
                    },
                    {
```

```
            containerId: "R6",
            status: "READ_INELIGIBLE",
        },
    ],
}
```

Using the tile metadata (version 5) shown above, the stream processor(s) may write incoming data to both the old replica group and the new replica group, where both replica groups share the spatial and temporal boundaries of the original tile. Additionally, the new replica group may be backfilled with data points within its spatial and temporal boundaries, e.g., by using the original tile as a source and performing a query of the original tile for data points within the new tile's range. In one embodiment, for a temporal split initiated before the starting time of the new tile, a backfill may be unnecessary because data within the new tile's time range may not have been received by the database 100. In one embodiment, a backfill may be attempted, but a query of the original tile for data within the new tile's boundaries may return no data. However, a backfill may be successfully performed for a spatial split or for a temporal split that is initiated after the original tile has received data within the new tile's time range. In one embodiment, the database 100 may limit "early" data (data points with customer-provided timestamps after the ingestion time) in order to further minimize data movement during tile splits.

The tile metadata may be updated again to further implement the tile split. In one embodiment, during a second step of the tile split following the potential backfill operation, the updated tile metadata 185A2 for the tile T1 may be represented with the following example data structure, with the original tile's temporal boundaries cropped to the 1-5 range, the new tile's temporal boundaries set to 5-10, the new replica group moved to a separate section (a sibling tile pointer) and marked as eligible for both reads and writes, and the version number incremented again:

```
{
    tileId: "T1",
    startTime: 1,
    endTime: 5,
    partitionStartKey: "0x0000",
    partitionEndKey: "0xFFFF",
    version: 6,
    status: "ACTIVE",
    replicas: [
        {
            containerId: "R1",
            status: "ACTIVE",
        },
        {
            containerId: "R2",
            status: "ACTIVE",
        },
        {
            containerId: "R3",
            status: "ACTIVE",
        },
    ],
    sibling_tile_pointer: {
        tileId: "T2",
        startTime: 5,
        endTime: 10
        partitionStartKey: "0x0000",
        partitionEndKey: "0xFFFF",
        version: 6,
        status: "ACTIVE",
        replicas: [
            {
                containerId: "R4",
                status: "ACTIVE",
            },
            {
                containerId: "R5",
                status: "ACTIVE",
            },
            {
                containerId: "R6",
                status: "ACTIVE",
            },
        ],
    },
}
```

The control plane 180 may store the updated tile metadata 185A2 using the metadata store 183. The metadata propagation 186 may provide the updated tile metadata 185A2 from the control plane 180 to the original storage nodes 161A, 161B, and 161N. In one embodiment, those storage nodes may then provide the updated tile metadata 185A2 to the relevant stream processors 140, e.g., when the stream processors submit write requests with an earlier version number of the tile metadata. For example, storage node 161A may provide the tile metadata 185A2 to one of the stream processors 140. In one embodiment, the control plane 180 may instead provide the updated tile metadata 185A2 directly to the relevant stream processors 140. The storage nodes 161C, 161D, and 161M for the new replica group may also be provided with the updated tile metadata 185A for the original tile.

Using the updated tile metadata 185A2, the stream processors 140 may route time-series data within the new spatial and temporal boundaries of the original tile to the replicas 162A, 162B, and 162N for the original tile. Also using the updated tile metadata 185A2, the stream processors 140 may route time-series data within the new spatial and temporal boundaries of the new tile to the replicas 163A, 163B, and 163N for the new tile. By enforcing the non-overlapping boundaries of the original tile and the new tile, duplicate data points may not be stored in the various tiles. The same data point (e.g., a data point for a particular measurement with a particular timestamp) may be stored in either the new replica group or the old replica group, but not both. Additionally, deduplication may be performed within a replica group. The deduplication may enhance the performance of queries, as discussed below. The writing of time-series data by the stream processors 140 may not be interrupted by the tile split, and the storage resources 160A may be scaled up without affecting their availability.

Figure 5:
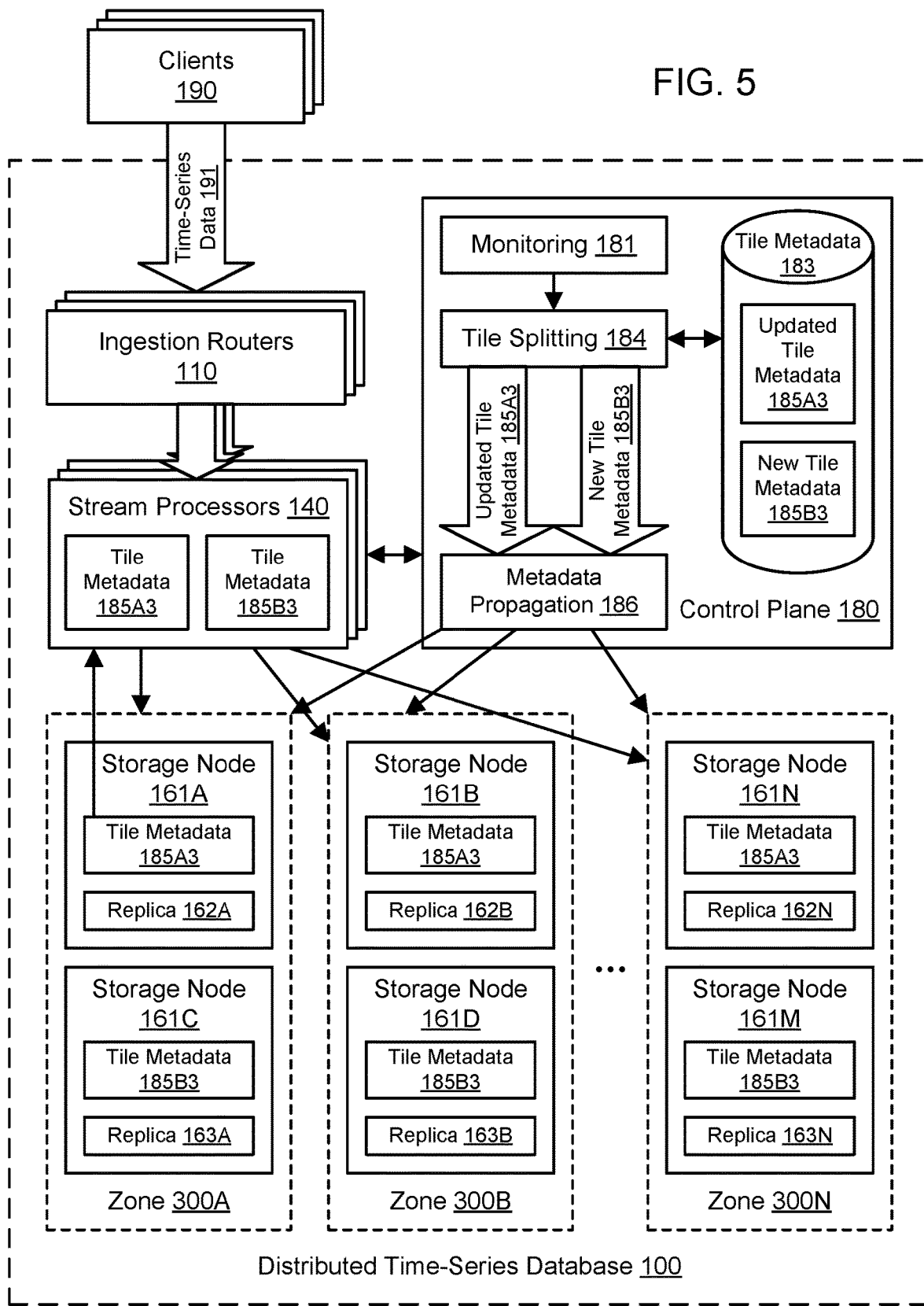
FIG. 5 illustrates further aspects of the example system environment for two-dimensional partition splitting in a time-series database, including a final state of the tile split, according to one embodiment.

FIG. 5 illustrates further aspects of the example system environment for two-dimensional partition splitting in a time-series database, including a final state of the tile split, according to one embodiment. As part of finalizing the tile split 184, the control plane 184 may generate another updated version 185A3 of the tile metadata for the original tile. The updated tile metadata 185A3 may again include identifiers and/or locations of the three original replicas 162A, 162B, and 162N; the status of the tile and the individual replicas (e.g., "ACTIVE" for both writes and reads); and the new spatial and temporal boundaries of those replicas (e.g., a first portion of the original time range and the same spatial range, or the same time range and a first portion of the original spatial range). Additionally, the updated tile metadata 185A3 may include a higher (e.g., incremented) version number of the metadata (e.g., version 7). The metadata for the new tile and the new replica group may be moved out of the updated tile metadata 185A3 and into its own tile metadata 185B3. The new tile metadata 185B3 may include identifiers and/or locations of the three new replicas 163A, 163B, and 163N; the status of the tile and the individual replicas (e.g., now "ACTIVE" for both writes and reads); and the spatial and temporal boundaries of those replicas (e.g., a second portion of the original time range and the same spatial range, or the same time range and a second portion of the original spatial range). The new tile metadata 185B3 may have the same version number (e.g., 7) as the updated tile metadata 185A3 for the original tile. In one embodiment, the data points for a replica that are outside of the corresponding tile's spatial and temporal boundaries may be truncated to conserve storage resources.

The control plane 180 may store the updated tile metadata 185A3 and the new tile metadata 185B3 using the metadata store 183. The metadata propagation 186 may provide the updated tile metadata 185A3 from the control plane 180 to the original storage nodes 161A, 161B, and 161N and the new tile metadata 185B3 to the storage nodes 161C, 161D, and 161M. In one embodiment, those storage nodes may then provide the updated tile metadata 185A3 and new tile metadata 185B3 to the relevant stream processors 140, e.g., when the stream processors submit write requests with an earlier version number of the tile metadata. For example, storage node 161A may provide the tile metadata 185A3 to one of the stream processors 140. In one embodiment, the control plane 180 may instead provide the updated tile metadata 185A3 and the new tile metadata 185B3 directly to the relevant stream processors 140.

Using the updated tile metadata 185A3, the stream processors 140 may route time-series data within the new spatial and temporal boundaries of the original tile to the replicas 162A, 162B, and 162N for the original tile. Using the new tile metadata 185B3, the stream processors 140 may route time-series data within the new spatial and temporal boundaries of the new tile to the replicas 163A, 163B, and 163N for the new tile. By enforcing the non-overlapping boundaries of the original tile and the new tile, duplicate data points may not be stored in the various tiles. The same data point (e.g., a data point for a particular measurement with a particular timestamp) may be stored in either the new replica group or the old replica group, but not both. Additionally, deduplication may be performed within a replica group. The deduplication may enhance the performance of queries, as discussed below.

Figure 6:
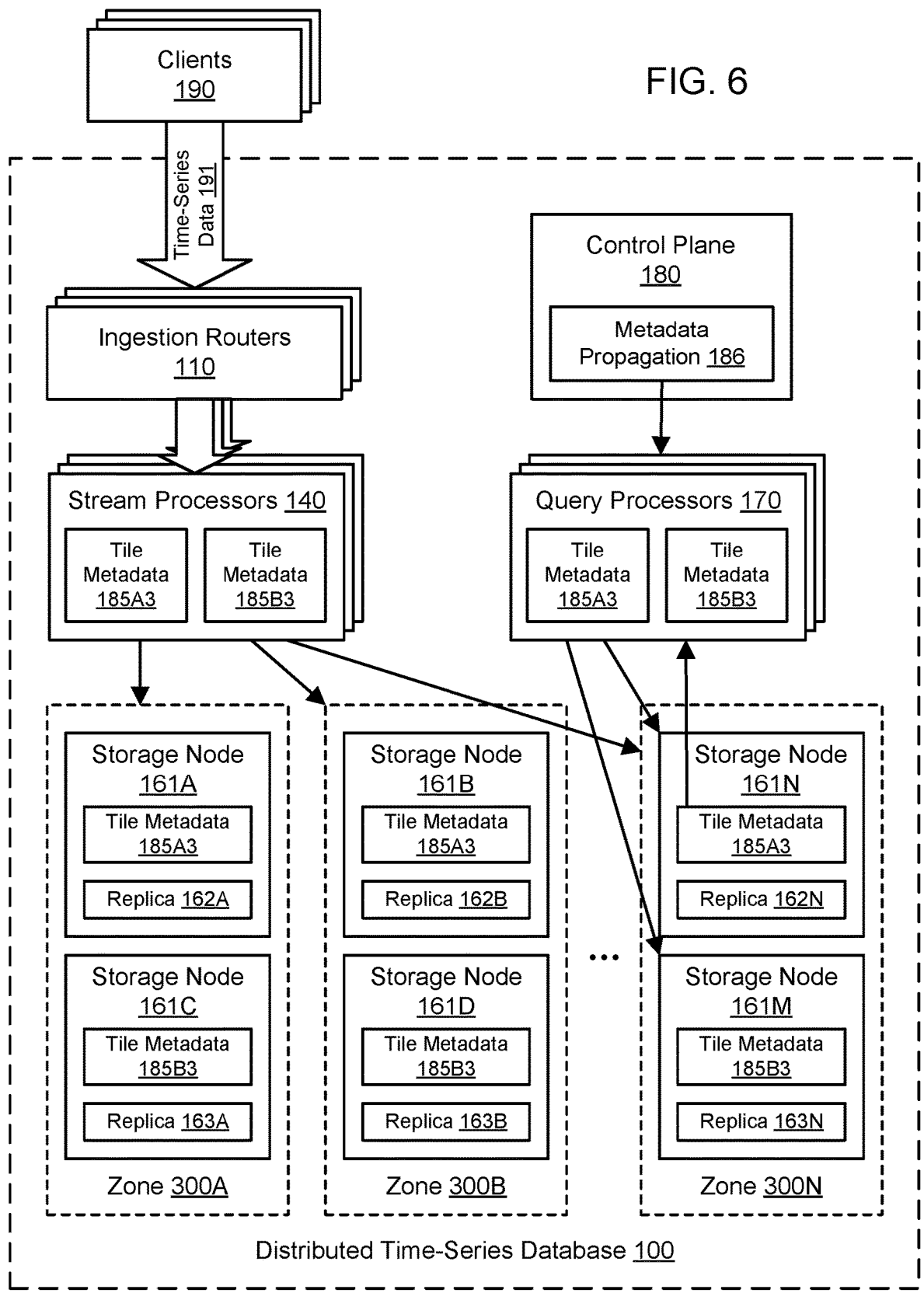
FIG. 6 illustrates further aspects of the example system environment for two-dimensional partition splitting in a time-series database, including query processors that perform query predicate pushdown to both the original tile and the new tile without having to perform deduplication of results, according to one embodiment.

FIG. 6 illustrates further aspects of the example system environment for two-dimensional partition splitting in a time-series database, including query processors that perform query predicate pushdown to both the original tile and the new tile without having to perform deduplication of results, according to one embodiment. A fleet of query processors 170 may execute queries against the various replicas in the storage tier 150A. The query processors may use the latest tile metadata (e.g., metadata 185A3 and 185B3) to identify replicas to be queried. Query requests to individual storage nodes may include the version number of the tile metadata. As discussed above with respect to writes, a query request for time-series data may be successful only if both the query processor and the storage node targeted for the query have the same version of the tile metadata. In one embodiment, tile metadata may first be propagated by the control plane 180 to the storage nodes, and the storage nodes may provide the latest tile metadata to query processors 170 that send query requests with outdated version numbers. For example, storage node 161N may provide the tile metadata 185A3 to one of the query processors 170. In one embodiment, the control plane 180 may instead provide the latest tile metadata 185A3 and 185B3 directly to the relevant query processors 170.

The query processors 170 may perform query predicate pushdown to individual storage nodes, and the storage nodes may perform local queries based on the query predicates. For example, if a query seeks to calculate a sum of measurement values for a given time range and given time series, and the time range encompasses two or more tiles, then the query processors 170 may ask individual replicas 162N and 163N for individual sums in their respective portions of the query's time range. The query processor may aggregate the sums to produce a final result of the query. If duplicate data points were stored in the two replicas 162N (the original tile) and 163N (the new tile), then the final result might be incorrect. By preventing duplicate data points from being stored within the same tile or within two different tiles resulting from a split, the query predicate pushdown may be performed to yield accurate query results without the need for time-consuming deduplication by the query processors 170.

Figure 7:
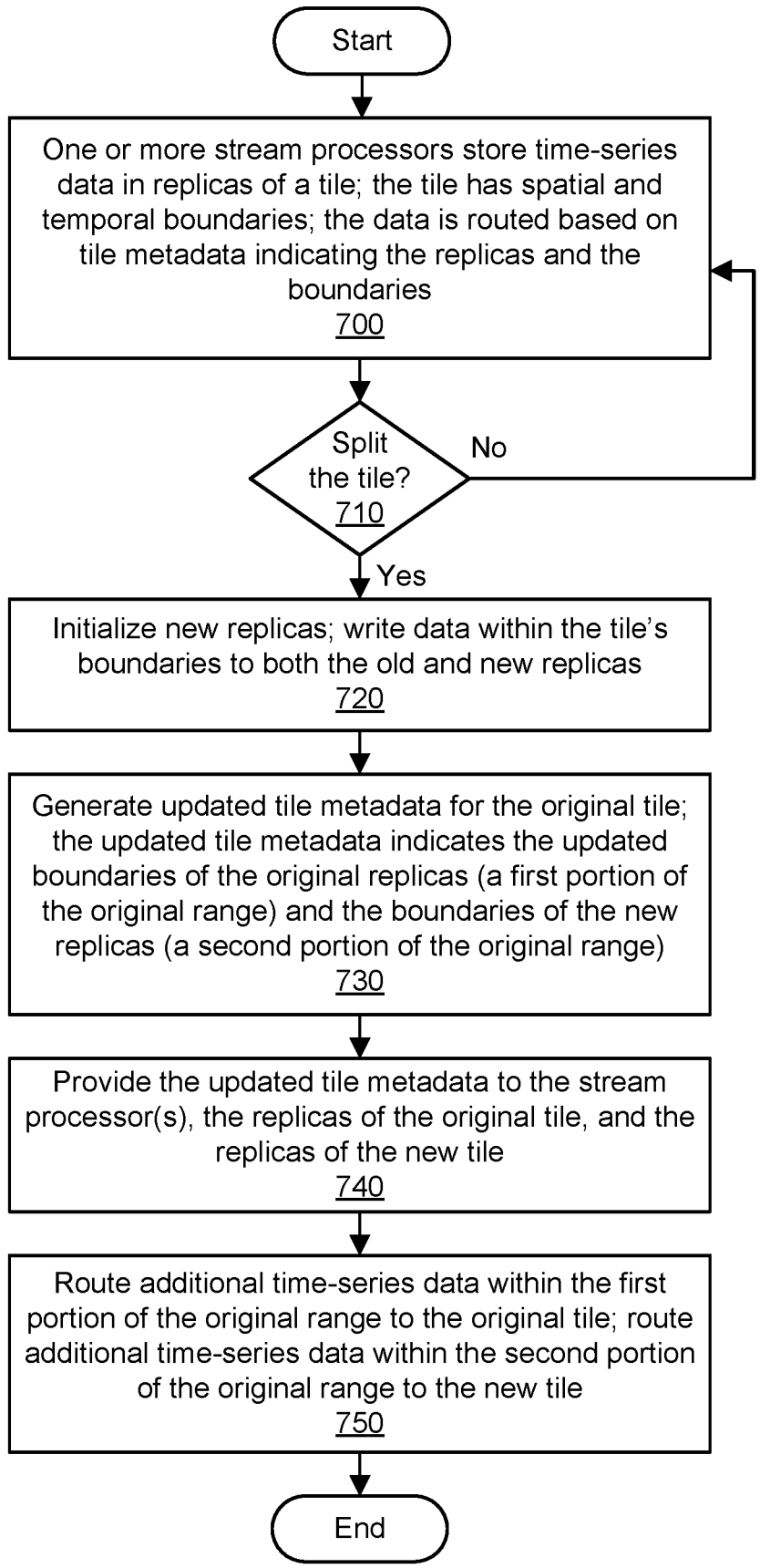
FIG. 7 is a flowchart illustrating a method for two-dimensional partition splitting in a time-series database, according to one embodiment.

FIG. 7 is a flowchart illustrating a method for two-dimensional partition splitting in a time-series database, according to one embodiment. As shown in 700, one or more stream processors may store time-series data in replicas of a tile. The tile may be part of a "hot" storage tier that offers low latency and high availability across a distributed set of storage resources of a time-series database. The tile may have particular spatial boundaries (e.g., a plurality of keys within a spatial range) and particular temporal boundaries (e.g., a starting time and an ending time). Data routed to the replicas by the stream processor(s) may fall within the spatial and temporal boundaries. The tile may have non-overlapping boundaries with other tiles in terms of the spatial and temporal dimensions, such that a data point for a given time series and with a given timestamp may be routed to one and only one tile. Tile metadata for the tile may identify the replicas (e.g., their locations) as well as the tile boundaries, and data points may be routed to the tile (e.g., to its replicas) based (at least in part) on that tile metadata. The tile metadata may also have a version number (e.g., version 1).

As shown in 710, the method (e.g., a control plane) may determine whether to split the tile. The control plane may include a monitoring component that obtains data relating to the usage and/or performance of the storage tier. For example, the monitoring may determine that the amount of storage resources for a particular set of spatial and temporal boundaries will be insufficient to meet the storage requirements of the time-series data in the near future. In one embodiment, the tile splitting may be initiated automatically, e.g., based (at least in part) on the monitoring. The tile splitting may be performed based on the observed state of the database or based on the anticipated state of the database. If the tile is to be split, then the method may proceed as shown in 720. If the tile is not to be split at this time, then the method may continue as shown in 700.

In one embodiment, the tile splitting may be initiated during the time range associated with the tile. For example, if the tile's temporal boundaries are 2 PM and 3 PM, then the control plane may initiate a split of the tile at 2:20 PM. In performing the tile split, the database may divide the spatial range and/or temporal range of the original tile. In one embodiment, the database may divide the time range into two portions for a two-way tile split. For a two-way tile split, a time range may be divided at some intermediate time between the original starting time and the original ending time. For example, an original time range of 2 PM to 3 PM may be divided into two new ranges of 2 PM to 2:30 PM (for the original tile) and 2:30 PM to 3 PM (for the new tile). The tile split may be initiated before or after the intermediate time. In one embodiment, the tile split may be initiated before the intermediate time to minimize data transfer during the split. In one embodiment, the database may divide the spatial range into two portions for a two-way tile split. For a two-way tile split, a spatial range may be divided at an intermediate key boundary such that the original tile is now limited to a first portion (e.g., a first half) of the original key range while the new tile is limited to a second portion (e.g., a second half) of the original key range. In one embodiment, temporal splits may be performed rather than spatial splits in order to minimize data transfer during the split.

As shown in 720, the method (e.g., the control plane) may initialize the new set of replicas for the new tile. The new replica group may be distributed across different availability zones, data centers, or geographical locations. An initialized replica may include a container for time-series data, e.g., having a particular storage capacity anticipated to meet the storage requirements of a tile. The locations of the replicas may be selected by the control plane. In one embodiment, the new replicas may be stored on different storage nodes (but in the same zones) as the original replicas. In one embodiment, one or more replicas in the new replica group may be stored using the same storage node as one or more replicas in the original replica group. In one embodiment, the new replica group may be stored across a different set of zones than the original replica group. At this stage of the method, the tile metadata may be updated to include the new replica group as additional replicas for the original tile. The stream processor(s) may write incoming data to both the old replica group and the new replica group, where both replica groups share the spatial and temporal boundaries of the original tile.

As shown in 730, the method (e.g., the control plane) may generate an updated version of the tile metadata. The updated tile metadata may include identifiers and/or locations of the original replicas; the status of those replicas (e.g., "ACTIVE" for both writes and reads); and the new spatial and temporal boundaries of those replicas (e.g., a first portion of the original time range and the same spatial range, or the same time range and a first portion of the original spatial range). The updated tile metadata may also include identifiers and/or locations of the new set of replicas; the status of the new replicas (e.g., "WRITE-ONLY" for writes but not reads); and the spatial and temporal boundaries of the new replicas (e.g., a second portion of the original time range and the same spatial range, or the same time range and a second portion of the original spatial range). Additionally, the updated tile metadata may include a higher (e.g., incremented) version number of the metadata (e.g., version 2).

As shown in 740, the method (e.g., the control plane) may provide the updated tile metadata to the stream processor(s) and to the storage nodes that store the replicas. In one embodiment, the metadata propagation may provide the updated tile metadata from the control plane to the original storage nodes. In one embodiment, those storage nodes may then provide the updated tile metadata to the relevant stream processor(s), e.g., when the stream processor(s) submit write requests with an earlier version number of the tile metadata. In one embodiment, the control plane may instead provide the updated tile metadata directly to the relevant stream processor(s). The storage nodes for the new replica group may also be provided with the updated tile metadata for the original tile, e.g., upon initialization of the new replicas.

As shown in 750, using the updated tile metadata, the stream processor(s) may route time-series data within the new spatial and temporal boundaries of the original tile to the replicas for the original tile. Also using the updated tile metadata, the stream processor(s) may route time-series data within the new spatial and temporal boundaries of the new tile to the replicas for the new tile. By enforcing the non-overlapping boundaries of the original tile and the new tile, duplicate data points may not be stored in the various tiles. The same data point (e.g., a data point for a particular measurement with a particular timestamp) may be stored in either the new replica group or the old replica group, but not both. Additionally, deduplication may be performed within a replica group. The deduplication may enhance the performance of queries, as discussed below. The writing of time-series data by the stream processor(s) may not be interrupted by the tile split.

Figure 8:
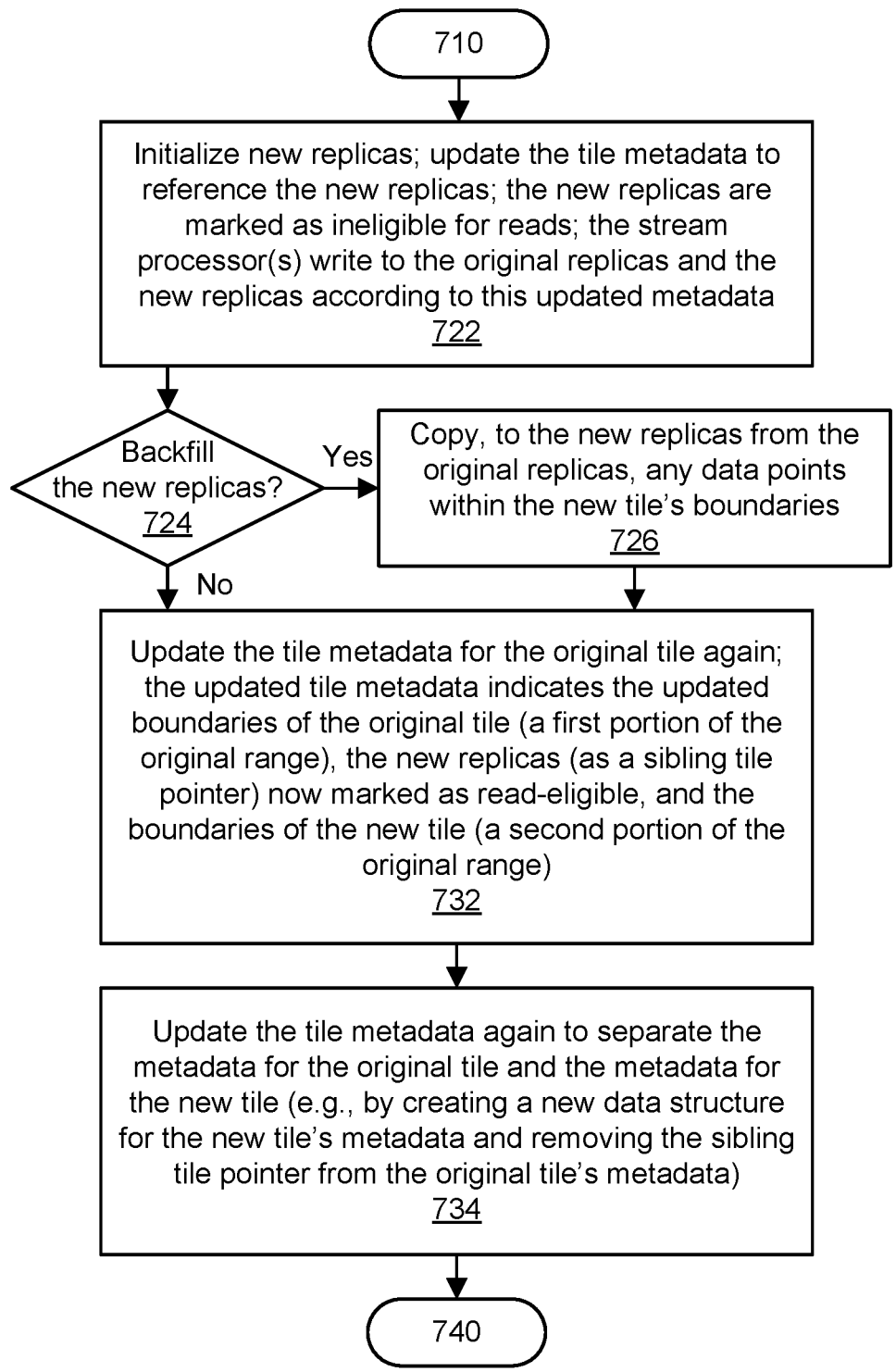
FIG. 8 is a flowchart illustrating further aspects of the method for two-dimensional partition splitting in a time-series database, including the use of a sibling tile pointer within the tile metadata, according to one embodiment.

FIG. 8 is a flowchart illustrating further aspects of the method for two-dimensional partition splitting in a time-series database, including the use of a sibling tile pointer within the tile metadata, according to one embodiment. The operations shown in FIG. 8 may be performed after the operation shown in 710 in FIG. 7 and before the operation shown in 740 in FIG. 7. As shown in 722, a new group of replicas may be initialized, and the tile metadata for the original tile may be updated to reference the new replicas. The new replicas may be marked as ineligible for reads but eligible for writes. A version number of the tile metadata may be increased to reflect one or more state transitions associated with the operation shown in 722. In one embodiment, the updated tile metadata may be propagated to storage nodes, stream processors, and query processors. Without taking the database offline, newly ingested data within the tile's original boundaries may be written to the original set of replicas and also to the new set of replicas.

As shown in 724, the method may determine whether to backfill the new replicas using data from the original replicas. If so, then as shown in 726, data points within the spatial and temporal boundaries of the new tile may be copied to the new tile from the original tile (e.g., using a query). In one embodiment, for a temporal split initiated before the starting time of the new tile, a backfill may be unnecessary because data within the new tile's time range may not have been received by the database. However, a backfill may be performed for a spatial split or for a temporal split that is initiated after the original tile has received data within the new tile's time range.

As shown in 732, the tile metadata for the original tile may be updated again. The updated tile metadata may now indicate the updated boundaries of the original tile. The updated tile metadata may also move the new replica group to a new section under a sibling tile pointer. The tile metadata may indicate the boundaries of the new tile, e.g., as the remainder of the original range after the original tile's new boundaries have been decided. The new tile and its replicas may be marked as read-eligible in the tile metadata so that query processors may now access their contents. A version number of the tile metadata may be increased to reflect one or more state transitions associated with the operation shown in 732. The updated tile metadata may be propagated to storage nodes, stream processors, and query processors. Using this updated tile metadata, newly ingested data within the original tile's new boundaries may be written to the original set of replicas, and newly ingested data within the new tile's new boundaries may be written to the new set of replicas.

As shown in 734, the tile metadata may be updated yet again. The sibling tile pointer (including the references to the new tile and the new replicas) may be removed from the tile metadata for the original tile. The metadata for the new tile may be moved to a new data structure that is propagated independently of the tile metadata for the original tile. A version number of the tile metadata for both the original tile and the new tile may be increased to reflect one or more state transitions associated with the operation shown in 734. Both sets of tile metadata may have the same version number. The method may continue with the operation shown in 740 in FIG. 7 so that both sets of tile metadata may be propagated to storage nodes, stream processors, and query processors.

In one embodiment, a forward tile pointer may be used in the tile metadata rather than a sibling tile pointer. Empty new replicas may be created and marked as eligible for queries. The new replicas may be associated with a second portion of the original tile's range (e.g., the same spatial range and the second half of the time range). A forwarding pointer to the new replicas may be set for the original replicas in the original tile's metadata. Newly ingested data points may be deduplicated at the original replicas or forwarded, if within the boundaries of the new tile, to the new replicas. The version number of the tile metadata may be incremented for both the original and new tiles. All write requests for the old version number on the original replicas may be drained. Data points within the new tile's boundaries may be copied from the original replicas, e.g., using a query. The forwarding pointer may be removed from the original tile metadata. The version number of the tile metadata may be incremented again for both the original and new tiles. All write requests for the old version number on the original replicas may be drained. The new replicas may be marked as query-eligible, and the version number of its tile metadata may be incremented again. In the same atomic update, the boundaries of the original tile may be updated to the first portion of the tile's original range (e.g., the same spatial range and the first half of the time range), and its version number may be incremented to the same version number as the new tile. Stream processors may then push data for the first portion of the original range to the original replicas and data for the second portion of the original range to the new replicas. All write requests for the old version number on the original replicas may be drained, and data outside of the original tile's new boundaries may be truncated.

Illustrative Computer System

In at least some embodiments, a computer system that implements a portion or all of one or more of the technologies described herein may include a computer system that includes or is configured to access one or more computer-readable media. FIG. 9 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 9 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more storage nodes storing an original tile, wherein the original tile comprises spatial boundaries and temporal boundaries, the temporal boundaries comprising an original starting time and an original ending time;
   one or more stream processors configured to write elements of time-series data to a first replica group storing the original tile, wherein the elements of time-series data are within the spatial boundaries and the temporal boundaries of the original tile; and
   a control plane comprising one or more processors and one or more memories to store computer-executable instructions that, when executed, cause the control plane to:
      initiate a split of the original tile based at least in part on an ingestion rate of the elements of time-series data, wherein to initiate the split of the original tile the computer-executable instructions, when executed, cause the control plane to:
         initialize a second replica group stored using the one or more storage nodes, wherein at least a portion of the elements of time-series data are written to the second replica group storing a new tile;
         generate updated metadata associated with the original tile, wherein the updated metadata comprises an indication of modified temporal boundaries of the first replica group, wherein the modified temporal boundaries represent a first time range from the original starting time to an intermediate time between the original starting time and the original ending time, wherein the updated metadata comprises an indication of the new tile stored by the second replica group, and wherein the new tile is associated with the spatial boundaries and new temporal boundaries representing a second time range from the intermediate time to the original ending time; and
         send the updated metadata to one or more of the storage nodes storing the original tile and the new tile; and
      wherein the one or more stream processors are further configured to:
         responsive to obtaining the updated metadata, write additional elements of the time-series data to the second replica group associated with the new tile and not to the first replica group associated with the original tile, wherein the additional elements are within the spatial boundaries and the new temporal boundaries, and wherein duplicate additional elements of the time-series data are not stored in the original tile and the new tile.

2. The system as recited in claim 1, wherein the first replica group comprises a first plurality of replicas, wherein the first replica group is eventually consistent, wherein the second replica group comprises a second plurality of replicas, and wherein the second replica group is eventually consistent.

3. The system as recited in claim 1, further comprising a query processor configured to:
  send, to one or more replicas of the first replica group associated with the original tile, a first query predicate associated with a query;
  send, to one or more replicas of the second replica group associated with the new tile, a second query predicate associated with the query; and
  aggregate a result of the first query predicate and a result of the second query predicate, wherein duplicate elements of the time-series data are not represented in the result of the first query predicate and the result of the second query predicate.

4. The system as recited in claim 1, wherein the control plane comprises additional computer-executable instructions that, when executed, cause the control plane to:
  generate an incremented version number for the updated metadata, wherein the updated metadata is obtained by the one or more stream processors, wherein write requests from the one or more stream processors comprise the incremented version number, and wherein successful writes of the additional elements are acknowledged by the new tile based at least in part on the incremented version number.

5. A method, comprising:
  writing, by one or more stream processors, elements of time-series data to a first replica group of one or more replicas storing a first tile, wherein the first tile comprises a first set of spatial and temporal boundaries, and wherein the elements of time-series data are within the first set of spatial and temporal boundaries; and
  initiating a split of the first tile based at least in part on an ingestion rate of the elements of time-series data, comprising:
    initializing a second replica group of one or more replicas, wherein the second replica group is associated with the spatial boundaries and the temporal boundaries, and wherein at least a portion of the elements of time-series data are written to the second replica group;
    generating, by a control plane, updated metadata associated with the first tile, wherein the updated metadata comprises an indication of a second tile stored by the second replica group, wherein the updated metadata comprises an indication of a modified first set of spatial and temporal boundaries associated with the first replica group and an indication of a second set of spatial and temporal boundaries associated with the second replica group, wherein the modified first set of spatial and temporal boundaries and the second set of spatial and temporal boundaries do not overlap, wherein the modified first set of spatial and temporal boundaries represents a first portion of the first set, wherein the second set of spatial and temporal boundaries represents a second portion of the first set, and wherein the updated metadata is obtained by the one or more stream processors; and
    writing, by the one or more stream processors, additional elements of the time-series data to the second replica group, wherein the additional elements are within the second set of spatial and temporal boundaries.

6. The method as recited in claim 5, wherein the modified first set of spatial and temporal boundaries indicates a first time range between the starting time and an intermediate time, and wherein the second set of spatial and temporal boundaries indicates a second time range between the intermediate time and the ending time.

7. The method as recited in claim 5, wherein the first set of spatial and temporal boundaries represents a spatial range comprising a plurality of keys, wherein the modified first set of spatial and temporal boundaries represents a first portion of the spatial range, and wherein the second set of spatial and temporal boundaries represents a second portion of the spatial range different from the first spatial range.

8. The method as recited in claim 5, further comprising:
  initiating, by the control plane, a split of the first tile, wherein the split is initiated based at least in part on an ingestion rate or a storage size associated with the first tile.

9. The method as recited in claim 5, further comprising:
  initiating, by the control plane, a split of the first tile, wherein the split is initiated based at least in part on a query rate associated with the first tile.

10. The method as recited in claim 5, further comprising:
  generating, by the control plane, an incremented version number for the updated metadata, wherein the incremented version number is obtained by the one or more stream processors and the first tile and the second tile, wherein write requests from the one or more stream processors comprise the incremented version number, and wherein successful writes of the additional elements are acknowledged by the second replica group based at least in part on the incremented version number.

11. The method as recited in claim 5, further comprising:
  sending, by a query processor to the first tile, a first query predicate associated with a query;
  sending, by the query processor to the second tile, a second query predicate associated with the query; and
  aggregating, by the query processor, a result of the first query predicate and a result of the second query predicate, wherein duplicate elements of the time-series data are not represented in the result of the first query predicate and the result of the second query predicate.

12. The method as recited in claim 5, further comprising:
  generating, by the control plane, metadata associated with the second tile, wherein the metadata associated with the second tile indicates the second set of spatial and temporal boundaries and indicates the second replica group associated with the second tile; and
  removing, by the control plane, the indication of the second replica group from the metadata associated with the first tile.

13. The method as recited in claim 5, further comprising:
  copying, from the first tile to the second tile, one or more of the elements of time-series data within the second set of spatial and temporal boundaries and not within the modified first set of spatial and temporal boundaries.

14. The method as recited in claim 5, further comprising:
  deleting, from the second tile, one or more elements of time-series data within the modified first set of spatial and temporal boundaries and not within the second set of spatial and temporal boundaries.

15. One or more non-transitory computer-readable storage media storing program instructions that, when executed on or across one or more processors, perform:
  writing, by one or more stream processors, a first plurality of elements of time-series data to a first replica group of one or more replicas storing a first tile, wherein the first tile is comprises a first set of spatial and temporal boundaries comprising an original starting time and an original ending time, and wherein the first plurality of elements of time-series data are within the first set of spatial and temporal boundaries;

initiating a split of the first tile based at least in part on an ingestion rate of the first plurality of elements of time-series data, comprising:

initializing a second replica group of one or more replicas, wherein the second replica group is associated with the spatial boundaries and the temporal boundaries;

writing, by the one or more stream processors, a second plurality of elements of time-series data to the first replica group and the second replica group, wherein the second plurality of elements of time-series data are within the first set of spatial and temporal boundaries; and generating, by a control plane, updated metadata associated with the first tile, wherein the updated metadata comprises an indication of a second tile stored by the second replica group, wherein the updated metadata comprises an indication of a modified first set of spatial and temporal boundaries associated with the first replica group and an indication of a second set of spatial and temporal boundaries associated with the second replica group, wherein the modified first set of spatial and temporal boundaries indicates a first time range between the starting time and an intermediate time, and wherein the second set of spatial and temporal boundaries indicates a second time range between the intermediate time and the ending time, and wherein the updated metadata is obtained by the one or more stream processors; and writing, by the one or more stream processors subsequent to obtaining the updated metadata, a third plurality of elements of the time-series data to the second replica group and not to the first replica group, and wherein the third plurality of elements are within the second set of spatial and temporal boundaries, and wherein duplicate elements of the time-series data are not stored in the first tile and the second tile.

16. The one or more non-transitory computer-readable storage media as recited in claim 15, further comprising additional program instructions that, when executed on or across the one or more processors, perform:

initiating a split of the second tile;

generating, by the control plane, second updated metadata associated with the second tile, wherein the second updated metadata comprises an indication of a third tile, wherein the second updated metadata comprises an indication of a modified second set of spatial and temporal boundaries associated with the second tile and an indication of a third set of spatial and temporal boundaries associated with the third tile, wherein the second set of spatial and temporal boundaries represents a spatial range comprising a plurality of keys, wherein the modified second set of spatial and temporal boundaries represents a first portion of the spatial range, wherein the third set of spatial and temporal boundaries represents a second portion of the spatial range different from the first spatial range, and wherein the second updated metadata is obtained by the one or more stream processors; and writing, by the one or more stream processors, further elements of the time-series data to the third tile, and wherein the further elements are within the third set of spatial and temporal boundaries.

17. The one or more non-transitory computer-readable storage media as recited in claim 15, wherein the first tile is queried for time-series data within the second set of spatial and temporal boundaries, wherein the query is performed after the second replica group is initialized and before the updated metadata is generated, and wherein the query returns no elements of the time-series data.

18. The one or more non-transitory computer-readable storage media as recited in claim 15, wherein the split is initiated based at least in part on a rate of writing the time-series data to the first tile.

19. The one or more non-transitory computer-readable storage media as recited in claim 15, further comprising additional program instructions that, when executed on or across the one or more processors, perform:

sending, by a query processor to the first tile, a first query predicate associated with a query;

sending, by the query processor to the second tile, a second query predicate associated with the query; and aggregating, by the query processor, a result of the first query predicate and a result of the second query predicate, wherein duplicate elements of the time-series data are not represented in the result of the first query predicate and the result of the second query predicate.

20. The one or more non-transitory computer-readable storage media as recited in claim 15, further comprising additional program instructions that, when executed on or across the one or more processors, perform:

generating, by the control plane, metadata associated with the second tile, wherein the metadata associated with the second tile indicates the second set of spatial and temporal boundaries and indicates the second replica group associated with the second tile; and removing, by the control plane, indications of the second tile and the second replica group from the metadata associated with the first tile.

* * * * *